(12) United States Patent
Hosseinimakarem et al.

(10) Patent No.: US 11,908,091 B2
(45) Date of Patent: Feb. 20, 2024

(54) CONSTRUCTING AN AUGMENTED REALITY IMAGE

(71) Applicant: Micron Technology, Inc., Boise, ID (US)

(72) Inventors: Zahra Hosseinimakarem, Boise, ID (US); Radhika Viswanathan, Boise, ID (US); Carla L. Christensen, Boise, ID (US); Bhumika Chhabra, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/959,020

(22) Filed: Oct. 3, 2022

(65) Prior Publication Data

US 2023/0024566 A1 Jan. 26, 2023

Related U.S. Application Data

(63) Continuation of application No. 17/005,166, filed on Aug. 27, 2020, now Pat. No. 11,494,992.

(51) Int. Cl.
*G06T 19/00* (2011.01)
*G01B 11/06* (2006.01)
*G01B 11/25* (2006.01)

(52) U.S. Cl.
CPC ........ *G06T 19/006* (2013.01); *G01B 11/0608* (2013.01); *G01B 11/2513* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,824,499 B2 | 11/2017 | Wright et al. | |
| 10,497,175 B2 | 12/2019 | Mount et al. | |
| 10,664,903 B1 * | 5/2020 | Haitani | G02B 27/017 |
| 11,461,630 B1 * | 10/2022 | Black | G06Q 30/0621 |
| 11,494,992 B2 * | 11/2022 | Hosseinimakarem | G06T 19/006 |
| 2013/0229482 A1 | 9/2013 | Vilcovsky et al. | |
| 2016/0071322 A1 | 3/2016 | Nishiyama et al. | |

(Continued)

OTHER PUBLICATIONS

Rennesson, Jean-Loup. "A full range of 3D body scanning solutions." 3rd Int. Conf. on 3D Body Scanning Technologies. 2012.

(Continued)

*Primary Examiner* — Ryan M Gray
(74) *Attorney, Agent, or Firm* — Brooks, Cameron & Huebsch, PLLC

(57) ABSTRACT

Methods, devices, and systems related to a computing device for capturing an augmented reality (AR) image displaying an AR are described. An example method can include projecting a structured array of light, from a mobile device, onto an object. The method further includes measuring multi-directional sections of the object with the projected light. The method further includes reconstructing a three-dimensional (3D) figure of the object based on the measured multi-directional sections. The method further includes displaying an augmented reality (AR) image associated with the 3D figure on a user interface of the mobile device.

20 Claims, 3 Drawing Sheets

(56) References Cited

U.S. PATENT DOCUMENTS

| | | | |
|---|---|---|---|
| 2017/0061693 A1 | 3/2017 | Kohler et al. | |
| 2017/0372504 A1 | 12/2017 | Jang | |
| 2019/0073831 A1 | 3/2019 | Kim | |
| 2020/0005386 A1 | 1/2020 | Blossey et al. | |
| 2020/0349758 A1* | 11/2020 | Paulson | G06T 15/04 |
| 2020/0371472 A1 | 11/2020 | Karafin et al. | |
| 2021/0073886 A1 | 3/2021 | Sights et al. | |
| 2021/0158557 A1* | 5/2021 | D'Souza | G06V 10/44 |
| 2021/0286424 A1* | 9/2021 | Ivanovitch | G06T 19/20 |
| 2022/0198780 A1* | 6/2022 | Doba | G06F 16/538 |

OTHER PUBLICATIONS

Apeagyei, Phoebe R. "Application of 3D body scanning technology to human measurement for clothing Fit." International Journal of Digital Content Technology and its Applications 4.7 (2010): 58-68.
Pribanic, Tomislav, et al. "3D structured light scanner on the smartphone." International Conference on Image Analysis and Recognition. Springer, Cham, 2016.

* cited by examiner

US 11,908,091 B2

CONSTRUCTING AN AUGMENTED REALITY IMAGE

TECHNICAL FIELD

This application is a Continuation of U.S. application Ser. No. 17/005,166, filed Aug. 27, 2020, the contents of which are incorporated herein by reference.

TECHNICAL FIELD

The present disclosure relates generally to a computing device, and more particularly, to methods, apparatuses, and systems related to constructing an augmented reality (AR) image.

BACKGROUND

A computing device can be, for example, a personal laptop computer, a desktop computer, a mobile device (e.g., a headset, a smart phone, a tablet, a wrist-worn device, a digital camera, etc.), and/or redundant combinations thereof, among other types of computing devices. In some examples, a computing device may construct an AR image and display the AR image on a user interface and/or perform artificial intelligence (AI) operations.

AR may overlay virtual objects on a real-world (e.g., natural) environment. For example, AR can add a 3D hologram to reality. In some examples, AR can be an interactive experience of a real-world environment where real-world objects are enhanced by computer-generated perceptual information. The AR can mask a portion of the real-world environment and/or add to the real-world environment such that it is perceived as an immersive aspect of the real-world environment. Accordingly, AR can alter a person's perception of a real-world environment and mixed reality. A heads-up display, a headset, a smart glass, smart contacts, a light field display, a laser, and/or several sources of light can be used to create AR.

DETAILED DESCRIPTION

Figure 1:
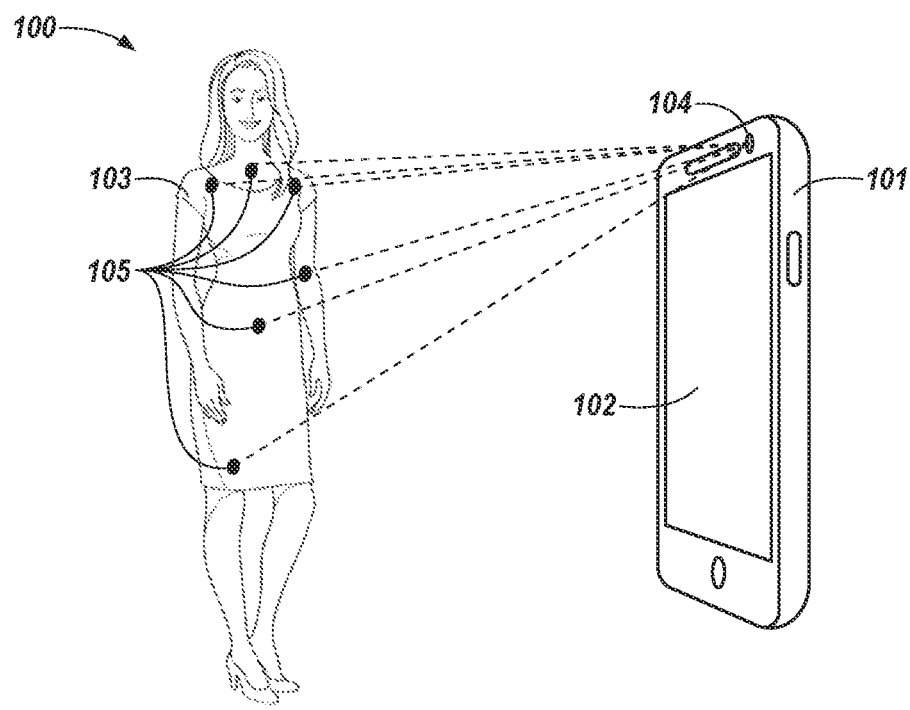
FIG. 1 illustrates an example of a computing device for constructing an AR image in accordance with a number of embodiments of the present disclosure.

The present disclosure includes methods, apparatuses, and systems related to constructing an AR image and displaying it on a user interface. An example method can include projecting a structured array of light, from a mobile device, onto an object. The method further includes measuring multi-directional sections of the object with the projected light. The method further includes reconstructing a three-dimensional (3D) figure of the object based on the measured multi-directional sections. The method further includes displaying an augmented reality (AR) image associated with the 3D figure on a user interface of the mobile device.

The computing device may include microsensors to construct an AR image. The microsensor may include an Infrared (IR) illuminator. The microsensors may be projected onto a user in the form of a dot projector. The dot projector may produce an IR illumination as a structured array of light. In some examples, a flood illuminator within the computing device may produce IR illumination. An IR illumination includes IR light, which includes electromagnetic radiation with wavelengths longer than those of visible light, such that the IR illumination may be invisible to the human eye. The IR illuminator may be used within the microsensor to shed light on an object. Sensors such as a proximity sensor and an ambient light sensor may be utilized by the computing device to determine how much illumination is needed to create a 3D figure.

As used herein, a 3D figure may refer to an image of an object that has height, width, and depth. The 3D figure may be formed with a technique developed to create the illusion of depth in the image. The 3D figure may be constructed using the patterns from a dot projector and a heat signature that is reflected from an object back to the IR illuminator.

As used herein, the dot projector is a structured light source that has flash components that emit a predetermined light pattern on the face of the dot projector. In some examples, the dot projector produces more than 30,000 dots of invisible IR illuminators for the measurements used to create the 3D figure, though other dot amounts are possible. An AR image may be projected from the 3D figure by projecting products onto the 3D figure. The AR image may also be projected as a hologram onto the user. The AR image may be displayed as a computing device-generated image superimposed on a user's real-world view and may be displayed on the user interface. As used herein, an AR image may refer to an image that overlays digital information, such as images, onto the 3D figure. For example, the AR image may be created by projecting a 3D figure by overlaying products on the 3D figure.

In a number of embodiments, a computing device is used to construct an AR image. A dot projector of the computing device may project small spots of IR illuminator that act as microsensors onto an object to collect measurements of the object. For instance, the object may be a person, such as a user of the computing device or an animal, among others. The IR illuminator may be used within the microsensor to shed light on an object as a structured array of light. The computing device may be set at a particular distance from the object to measure the object using the structured array of light. The object, in some examples, can be the body width of the user. That is, a dot projector may project small spots of IR illumination, projecting a structured light onto the body width of the user to collect the body measurements of the user, with the structured light acting as a measuring instrument for the body width of the user. In such an example, the computing device may be set at a particular distance from the user to obtain the user's measurements using the structured light. The dot projector may be projected onto the user's face, shoulders, arms, legs, feet, or a combination thereof, for example.

The measurements may be gathered and used to construct a 3D figure of the object. That is, a 3D figure of the user may be constructed based on the information collected by the structured light. An AR image may be formed based on the 3D figure. The AR image may be displayed on the user interface of the computing device. The AR image may be displayed as a computing device-generated image superimposed on a user's real-world view. The AR image may also be projected onto the user as a hologram. The AR image projection may be of the product to be viewed on the user. The AR image projection may be of the user's 3D figure wearing the product. The AR image may be accessible by the computing device. The hologram may be viewed using an AR headset. For example, the AR image may be saved in memory on and/or external to the computing device.

In the following detailed description of the present disclosure, reference is made to the accompanying drawings that form a part hereof, and in which is shown by way of illustration how one or more examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, "a number of" something can refer to one or more of such things. For example, a number of computing devices can refer to one or more computing devices. A "plurality" of something intends two or more.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "2" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a computing device 101 for constructing an AR image in accordance with a number of embodiments of the present disclosure. As used herein a "computing device" may refer to any electrical device which runs using an operating system that is loaded onto the electronic device. Examples of a computing device may include a personal laptop computer, a desktop computer, a mobile device (e.g., a mobile phone, a smart phone, a tablet, a wrist-worn device, a digital camera, etc.), and/or redundant combinations thereof. The computing device 101 can include a processing resource (not illustrated in FIG. 1) communicatively coupled to a memory (not illustrated in FIG. 1) to perform functions associated with constructing an AR image.

In a number of embodiments, the computing device 101 may include a camera 104. In some examples, computing device 101 may include one or more cameras. One of the one or more cameras may be used solely for constructing AR images. In a number of embodiments, one or more optical sensors may be used with one or more cameras to construct the 3D figure associated with an AR image. The camera 104 may project a structured array of light 105 onto an object. The object may be a person, such as user 103 of the computing device.

A dot projector within the camera 104 may project small spots of IR illumination having a structured array of light 105 on the user 103 to collect the user's measurements. The structured array of light 105 may act as a measuring instrument for the user's body 103. That is, the structured array of light 105 may measure the body width of the user 103, collecting the measurements needed for proper fit and function of a product on the user 103. As such, the computing device 101 may be set at a particular distance from the user 103 to obtain the user's measurements using the structured array of light 105. The dot projector may be projected onto the user's face, shoulders, arms, legs, feet, or a combination thereof, for example.

A 3D figure may be created based on the measurements obtained from the structured array of light. The dot project may acquire measurements for the height and weight for the user 103, among others. The measurements acquired may also include clothing measurements for the user 103 such as clothing sizes and measurements (neck size, sleeve length and width, and waist width, among others). Measurements are not limited to the user's body 103 and may also be taken for a user's head or foot. In one example, the structured array of light 105 may be used to measure a width of a user's face. In another example, the structured array of light 105 may be used to measure a width and length of a user's foot.

In some examples, the 3D figure may be created based on a picture accessible by the computing device 101. The structured array of light 105 may also be used to obtain the user's measurements based on a scaled measurement of the picture. That is, the structured array of light 105 may be used to measure the user 103 and gather measurements needed for proper fit and function of a product on the user 103. The measurements may be accessible by the computing device 101. For example, the measurements may be stored in a memory on and/or external to the computing device 101.

An AR image may be formed based on the 3D figure captured using the structured array of light 105 within the camera 104. The AR image may be displayed on the user interface 102. After receiving the AR image, the user 103 may choose to use or discard the received AR image. For example, the user 103 may save a preferred AR image. In another example, the user 103 may discard the AR image and choose another AR image based on a user's 3D figure. The computing device 101 may prompt the user 103 to upload another 3D figure or to use a different AR image based on the 3D figure chosen. The user 103 may choose an AR image based on a previous 3D figure uploaded by the user 103.

The user 103 may set a preferred 3D figure. The preferred 3D figure may be accessible by the computing device 101. For example, the preferred 3D figure may be saved in memory on and/or external to the computing device 101. The saved 3D figure may be accessed by using a password. As used herein, the term password refers to a form of security used for user authentication to gain access to a system. For example, it may include but is not limited to pin numbers, passcodes, passkey, eye scan, or facial recognition, etc. A saved 3D figure may be accessed at a later time to create an AR image. A user 103 may use or discard a saved 3D figure when accessed.

The user 103 may also set a preferred AR image. The preferred AR image may be accessible by the computing device. For example, the preferred AR image may be saved in memory on and/or external to the computing device. The saved AR image may be accessed by using a password. The preferred AR image may be accessed at a later time. A user 103 may use or discard the saved AR image when accessed.

The AR image may be copied from the user interface 102 onto other mediums. Examples of the other mediums may include but are not limited to a website, a document, or an email. In one example, the AR image may be uploaded directly to a product website. For instance, a user may utilize the AR image to virtually try on clothing from the product's website. In another example, the user 103 may transfer the AR image from the memory of the computing device 101 onto the product website. In such an example, the user may store the AR image locally on the memory of the computing device and access it when desired (e.g., to transfer to the product website). In some examples, the AR image may be copied to a website, a different mobile device, or both. In other examples, the computing device may display and/or automate a number of images and/or enhance the AR image 104 to move and/or change on the user interface 102. For instance, the user 103 may rotate the AR image and display the rotation on the user interface 102.

Figure 2:
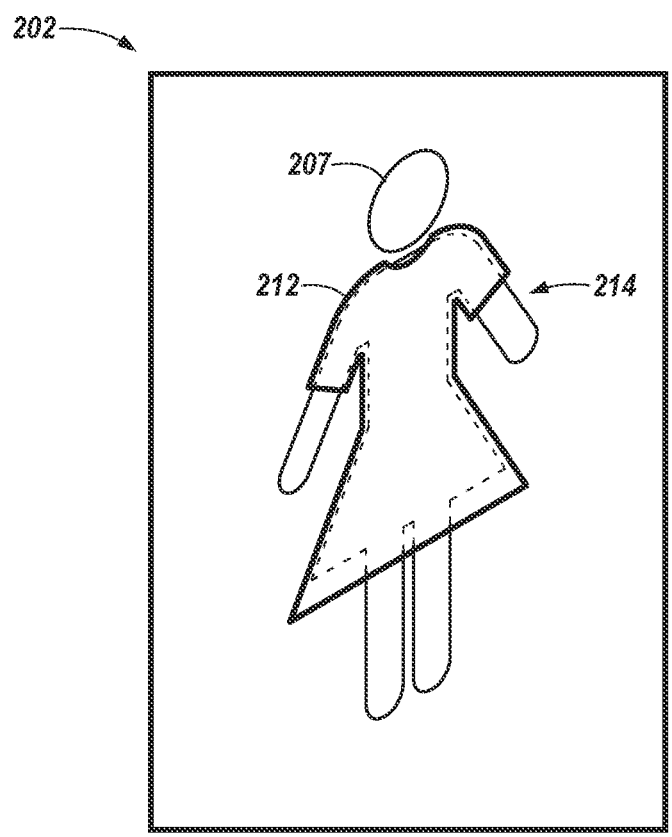
FIG. 2 illustrates an example of a user interface of a computing device for constructing an AR image in accordance with a number of embodiments of the present disclosure.

FIG. 2 illustrates an example of a user interface 202 of a computing device for constructing an AR image in accordance with a number of embodiments of the present disclosure. In a number of embodiments, the user interface 202 may be activated in response to detecting a 3D figure via a camera. The 3D figure may be displayed on the user interface 202 (e.g., displayed 3D FIG. 207), and an AR image may be displayed on the user interface 202 based on the displayed 3D FIG. 207. That is, the AR image may be displayed on the user interface 202 by projecting a digital image onto the displayed 3D FIG. 207. In one example, the digital image may be an article of clothing.

A user of the computing device may interact with the computing device via a user interface 202 shown on a display. The user interface 202 may be generated by the computing device. For example, the user interface 202 may be a graphical user interface (GUI) that can provide and/or receive information to and/or from the user. The user interface 202 may be shown on a display of the computing device. In some examples, the display may be a touchscreen.

In some examples, the user interface 202 may include a notification. For instance, the user interface 202 may display a notification to notify a user that a 3D figure has been captured by a structured array of light (e.g., structured array of light 105 in FIG. 1). The 3D figure may be displayed on the user interface 202 as displayed 3D FIG. 207. An AR image may be derived from the 3D figure and displayed on the user interface 202 as displayed in 3D FIG. 207. The AR image overlays digital information, such as images, onto the displayed 3D FIG. 207. The AR image may be produced by placing a product on the displayed 3D FIG. 207. The product may be an article of clothing. For instance, a user may choose an article of clothing, and using a digital pen or finger, the user can move the chosen article onto the displayed 3D FIG. 207. The AR image may be produced by placing clothing on the displayed 3D FIG. 207 head, torso, limbs, feet, or a combination thereof, for example. The clothing may be a dress, as shown in FIG. 2, but embodiments of the present disclosure are not limited to this example.

In some examples, the user interface 202 may display multiple products on the AR image. The user interface 202 is responsive to receiving a selection on the user interface 202 such as a user pressing, tapping, and/or clicking on the user interface 202 of the computing device. A selection may be made to access saved 3D figures or saved AR images. A selection may also be made of the product to be placed on the 3D figure. In a number of embodiments, the user interface 202 may display an AR image responsive to the computing device receiving a password.

In some examples, the product may be found in an online marketplace. The product may be scaled down to fit the proportions of the 3D figure and/or the displayed 3D FIG. 207. The product may be scaled down by the retailer such that the product may fit the user appropriately. The user may choose an outfit that appropriately fits the user's measurements based on the measurements acquired by the structured array of light of the computing device's camera.

Figure 3:
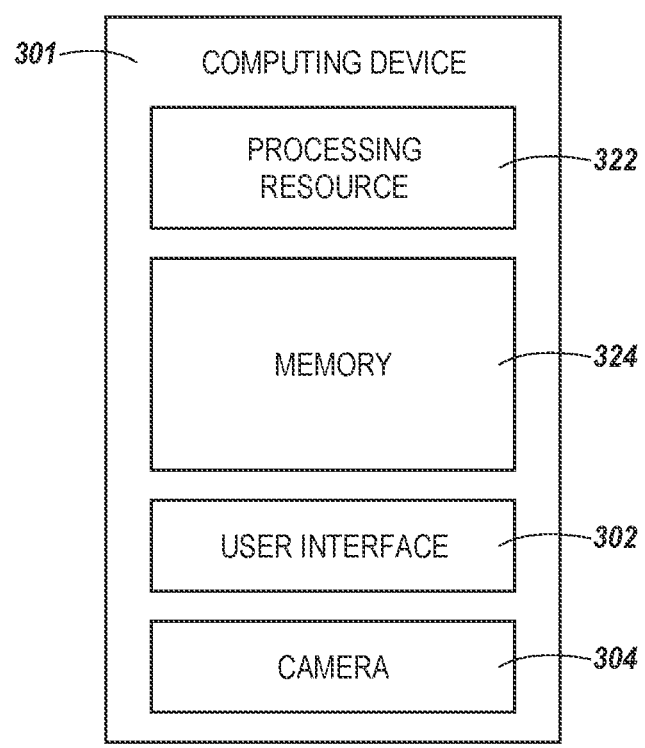
FIG. 3 illustrates another example of a computing device for constructing an AR image in accordance with a number of embodiments of the present disclosure.

FIG. 3 illustrates an example of a computing device 301 used for constructing an AR image in accordance with a number of embodiments of the present disclosure. As illustrated in FIG. 3, computing device 301, such as a mobile device, may include a processing resource (e.g., processor) 322, a memory 324, a user interface 302, and a camera 304.

The memory 324 may be any type of storage medium that can be accessed by the processing resource 322 to perform various examples of the present disclosure. For example, the memory 324 may be a non-transitory computer readable medium having computer readable instructions (e.g., computer program instructions) stored thereon that are executable by the processing resource 322 to receive an input at the computing device 301, detect a user via a camera 304 on the computing device 301, capture a 3D figure, and display an AR image on a user interface 302 of the computing device 301 in accordance with the present disclosure.

The memory 324 may be volatile or nonvolatile memory. The memory 324 may also be removable (e.g., portable) memory, or non-removable (e.g., internal) memory. For example, the memory 324 may be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 324 is illustrated as being located within computing device 301, embodiments of the present disclosure are not so limited. For example, memory 324 may be located on an external computing resource (e.g., enabling computer readable instructions to be downloaded over the Internet or another wired or wireless connection).

As illustrated in FIG. 1, computing device 301 includes a user interface 302. A user (e.g., operator) of computing device 301 may interact with computing device 301 via a user interface 302 shown on a display. For example, the user interface 302 via a display may provide (e.g., display and/or present) information to the user of computing device 301, and/or receive information from (e.g., input/selection by) the user of computing device 301. For instance, in some embodiments, the user interface 302 may be a GUI that can provide and/or receive information to and/or from the user of computing device 301. The display showing the user interface 302 may be, for instance, a touchscreen (e.g., the GUI can include touchscreen capabilities).

The computing device 301 may include one or more cameras 304. The one or more cameras 304 may be used to detect an object and to project a structured array of light. In some examples, one of the one or more cameras 328 may be used solely for detecting an object. In a number of embodiments, one or more optical sensors (e.g., sensors 105 in FIG. 1), may be used with the one or more cameras or instead of the one or more cameras to detect the user.

The computing device 301 may also include an eye tracking sensor, a tracking device, a proximity sensor, microelectromechanical system (MEMS) Gyroscope, or a combination thereof. The combinations of these technologies within the computing device 301 may assist in defining a user's product preference, suggestions of future products. The computing device 301 may be able to detect a user's movement, closeness to the computing device 301, location, or rate of rotation, based on which technology is added to the computing device 301.

The processing resource 322 may also be configured to execute executable instructions stored in the memory 324 to upload the AR image from the memory of the mobile device to a product website. The AR image may be displayed on the user interface of the computing device, copied from the user interface onto other mediums, or both. Examples of the other mediums may include, but are not limited to a website, a document, or an email.

The processing resource 322 may also be configured to execute executable instructions stored in the memory 324 to display the 3D figure on the user interface 302. A user of the computing device may interact with the computing device 301 via a user interface 302. The user interface 302 may be generated by the computing device 301. In a number of embodiments, the user interface 202 may be activated in response to detecting a 3D figure via a camera 328. The 3D figure may be displayed on the user interface 302.

The processing resource 322 may also be configured to execute executable instructions stored in the memory 324 to capture images of the user using the camera of the mobile device and construct additional 3D figures using the captured images. After a 3D figure has been created using measurements from the structured array of light of the camera 328, the computing device 301 may prompt the user to upload additional 3D figures using images captured by the user. As such, the computing device 301 may prompt the user to capture more images, and the user may use the captured images to create additional 3D figures. The 3D figures may then be used to create an AR image. The user may choose a previously saved 3D figure or choose to upload a new 3D figure.

The processing resource 322 may also be configured to execute executable instructions stored in the memory 324 to write at at least one of the 3D figures or the AR images to the memory or discard at least one of the 3D figure or the AR image, or a combination thereof. The user may set a preferred 3D figure. The preferred 3D figure may be accessible by the computing device 301. For example, the preferred 3D figure may be saved in memory on and/or external to the computing device 301. In another example, the user may discard the 3D figure and choose another 3D figure using the structured array of light of the camera 328 or an image saved within the memory 324.

The saved 3D figure may be accessed by using a password. The processing resource 322 may also be configured to execute executable instructions stored in the memory 324 to access the at least one of the 3D figures or the AR images written to the memory using a password. A saved 3D figure may be accessed at a later time to create an AR image. A user may use or discard a saved 3D figure when accessed.

The user may also set a preferred AR image. The preferred AR image may be accessible by the computing device 301. For example, the preferred AR image may be saved in memory on and/or external to the computing device 301. The saved AR image may be accessed by using a password. The preferred AR image may be accessed at a later time. A user may use or discard the saved AR image when accessed.

Figure 4:
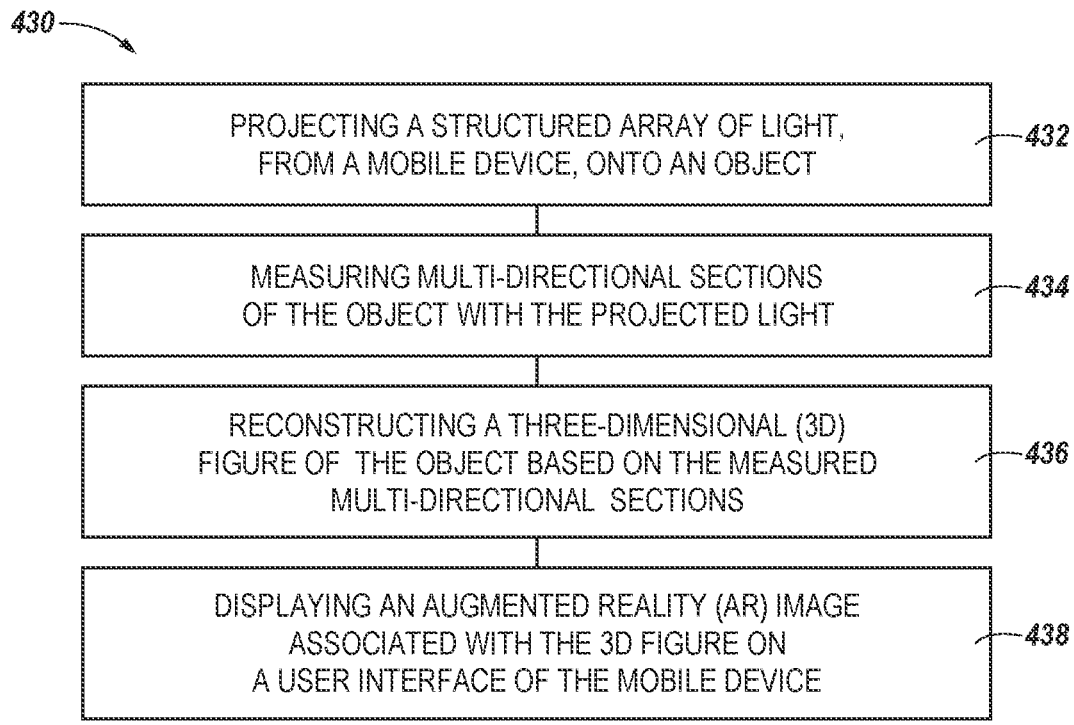
FIG. 4 is a flow diagram of a method for constructing an AR image in accordance with a number of embodiments of the present disclosure.

FIG. 4 is a flow diagram of a method 430 for constructing an AR image in accordance with a number of embodiments of the present disclosure. The method 430 may be performed by a mobile device or other computing devices. For instance, the method may be performed using a processing resource, a memory communicatively coupled to the processing resource, or a combination thereof.

At block 432, the method 430 may include projecting a structured array of light, from a mobile device, onto an object. In some examples, the mobile device may include a structured array of light to construct a 3D figure. A flood illuminator within the mobile device may produce IR illumination, and/or a dot projector within the mobile device may project small spots of IR illumination onto an object to gather the measurements of the object. The object may be a person, such as a user of the mobile device or an animal, among others. The IR illuminator may be used to shed light on the object during construction of the 3D figure.

At block 434, the method 430 may include measuring multi-directional sections of the object with the projected structured array of light. The computing device may be set at a particular distance from the object to measure the object using the structured array of light. That is, a dot projector may project small spots of IR illumination that act as structured arrays of light onto the body width of the user to collect the user's measurements. The dot projector may be projected onto the user's face, shoulders, arms, legs, feet, or a combination thereof, for example.

The measurements acquired may include clothing measurements for the body width of a user such as clothing sizes and measurements (e.g., neck size, sleeve length and width, and waist width, among others). Measurements are not limited to the body width of the user and may also be taken for a user's head or foot. In one example, the structured array of light may be used to measure a width of a user's head. In another example, the structured array of light may be used to measure a width and length of a user's foot.

At block 436, the method 430 may include reconstructing a 3D figure of the object based on the measured multi-directional sections. The measurements received using the structured array of light may be used to construct a 3D figure of the object. The object may be a user. That is, a 3D figure of the user may be constructed based on the information collected by the structured array of light within the camera of a computing device.

In some examples, the 3D figure may be created based on a picture accessible by the computing device. The structured array of light may also be used to obtain the user's measurements based on a scaled measurement of the picture. That is, the structured array of light may be used to measure the user and gather measurements needed for proper fit and function of a product on the user. The measurements may be accessible by the computing device. For example, the measurements may be stored in a memory on and/or external to the mobile device.

At block 438, the method 430 may include displaying an AR image associated with the 3D figure on a user interface of the mobile device. An AR image may be derived from the 3D figure. AR can overlay virtual objects on a real-world environment to mask a portion of the real-world environment and/or add to the real-world environment such that it is perceived as an immersive aspect of the real-world environment. The AR image may be displayed as a computing device-generated image superimposed on a user's real-world view. The AR image may be viewed by projecting a hologram of the product onto the user. The AR image may also be viewed by projecting a hologram of the user's 3D figure wearing the product. The user may be using an AR headset to view the hologram.

In some examples, the computing device may display and/or automate a number of images and/or enhance an AR image to move and/or change on the user interface. For instance, the user may rotate the AR image and display the rotation on the user interface. The AR image may be displayed on the user interface of the computing device. The AR image may be produced by projecting a product such as an article of clothing on the 3D figure. The AR image may be produced by placing clothing on the 3D figure's head, torso, limbs, feet, or a combination thereof.

In some examples, the product may be found in an online marketplace. The product may be displayed on the user interface as a 3D model. The product may be scaled down to fit the proportions of the 3D figure. The product may be scaled down by the retailer such that the product may fit the user appropriately. The user may choose an outfit that appropriately fits the user's measurements based on the measurements acquired by the structured array of light of the computing device's camera. The resulting AR image may be displayed on the user interface of the mobile device. The AR image may be copied from the user interface onto other mediums such as a website, a document, or an email, among others.

Figure 5:
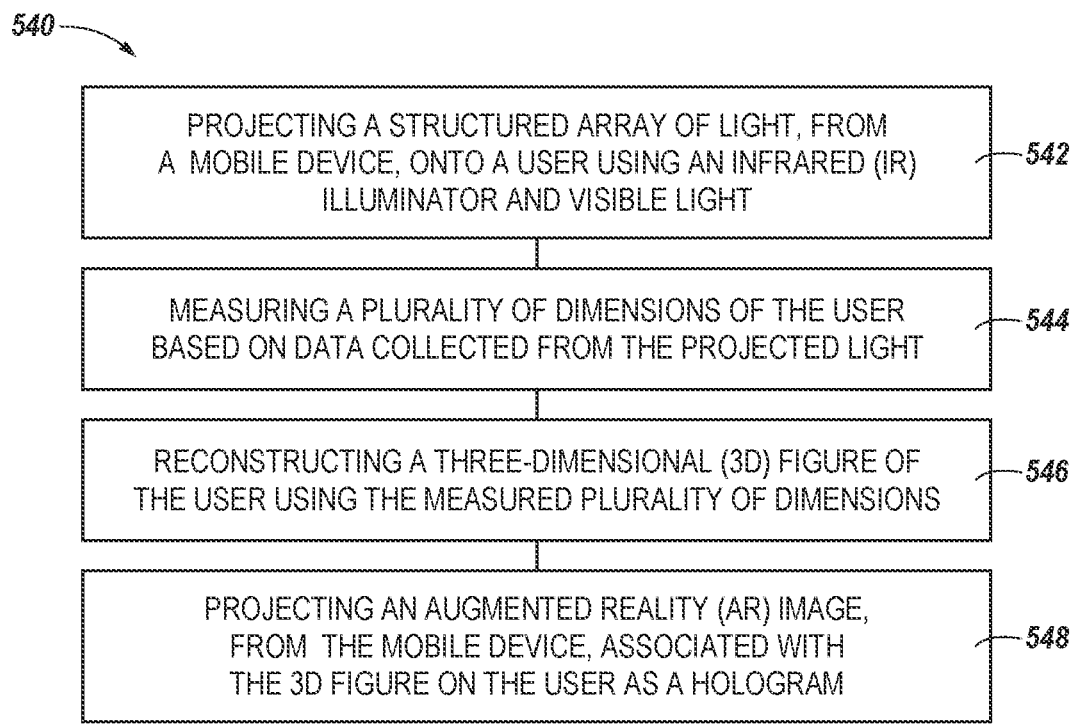
FIG. 5 is another flow diagram of a method for constructing an AR image in accordance with a number of embodiments of the present disclosure.

FIG. 5 is a flow diagram of a method 540 for constructing an AR image in accordance with a number of embodiments of the present disclosure. The method 540 may be performed by a mobile device or other computing devices. For instance, the method may be performed using a processing resource, a memory communicatively coupled to the processing resource, or a combination thereof.

At block 542, the method 430 may include projecting a structured array of light, from a mobile device onto a user using an Infrared (IR) illuminator and visible light. The computing device may include a flood illuminator within the computing device to construct a 3D figure. The IR illuminator may be used in combination with visible light to project a structured array of light on the user. A dot projector within the computing device may project small spots of IR illumination onto the user to gather the user's measurements. The dot projector may be projected onto the user's face, shoulders, arms, legs, feet, or a combination thereof, for example.

At block 544, the method 540 may include measuring a plurality of dimensions of the user based on data collected from the projected light. The multi-directional measurements may include the height and weight of the user, among others. The mobile device may be set at a particular distance from the user to measure the body width of the user. That is, a dot projector may project small spots of IR illumination that act as a structured array of light onto the user to collect the user's measurements.

The measurements acquired may include clothing measurements for the body width of the user such as clothing sizes and measurements (e.g., neck size, sleeve length and width, and waist width, among others). Measurements are not limited to the body width of the user and may also be taken for a user's head or foot. In one example, the structured array of light may be used to measure a width of a user's head. In another example, the structured array of light may be used to measure a width and length of a user's foot.

At block 546, the method 540 may include reconstructing a 3D figure of the user using the measured plurality of dimensions. The measurements received using the structured array of light may be used to construct a 3D figure of the user. That is, a 3D figure of the user may be constructed based on the information collected by the structured array of light.

At block 548, the method 540 may include projecting an AR image, from the mobile device, associated with the 3D figure on the user as a hologram. An AR image may be derived from the 3D figure. AR can overlay virtual objects on a real-world environment to mask a portion of the real-world environment and/or add to the real-world environment such that it is perceived as an immersive aspect of the real-world environment.

The AR image may be projected on the user interface of the computing device. The AR image may be produced by placing a product such as an article of clothing on the 3D figure. The AR image may be produced by placing clothing on the 3D figure's head, torso, limbs or feet. The AR image may be displayed as a computing device-generated image superimposed on a user's real-world view. The AR image may be viewed by projecting a hologram of the product onto the user. The AR image may also be viewed by projecting a hologram of the user's 3D figure wearing the product. The user may be using an AR headset to view the hologram.

After receiving the AR image, the user may choose to use or discard the received AR image. For example, the user may set a preferred AR image. The user may also save the preferred AR image. The preferred AR image may be accessible by the mobile device. For example, the preferred AR image may be saved in memory on and/or external to the mobile device. The saved AR image may be accessed by using a password. The preferred AR image may be accessed at a later time.

In some examples, the mobile device may display and/or automate a number of images and/or enhance an AR image to move and/or change on the user interface. For instance, the user may rotate the AR image and display the rotation on the user interface.

In the above detailed description of the present disclosure, reference is made to the accompanying drawings that form a part hereof, and in which is shown by way of illustration how one or more examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

It is to be understood that the terminology used herein is for the purpose of describing particular examples only and is not intended to be limiting. As used herein, the singular forms "a", "an", and "the" include singular and plural referents, unless the context clearly dictates otherwise, as do "a number of", "at least one", and "one or more" (e.g., a number of memory arrays may refer to one or more memory arrays), whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically and, unless stated otherwise, can include a wireless connection for access to and/or for movement (transmission) of instructions (e.g., control signals, address signals, etc.) and data, as appropriate to the context.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   accessing, from a mobile device, a captured image of an object;
   measuring the object within the captured image on a user interface of the mobile device using projected light from the mobile device;
   constructing a three-dimensional (3D) figure of the object based on the measurements; and
   displaying an augmented reality (AR) image associated with the 3D figure as a hologram.

2. The method of claim 1, further comprising uploading the AR image from the memory of the mobile device to a product website.

3. The method of claim 1, further comprising displaying products on the 3D figure on the user interface of the mobile device.

4. The method of claim 3, further comprising projecting the product on the 3D figure as the AR image.

5. The method of claim 3, further comprising:
   receiving, at the mobile device, 3D models of products from a product website; and
   placing the products on the 3D figure of the object.

6. The method of claim 1, further comprising displaying the AR image as a computing device-generated image superimposed on a user's real-world view.

7. The method of claim 1, further comprising rotating and moving the projected AR image responsive to user interaction with a user interface of the mobile device.

8. A device, comprising:
   a user interface of a mobile device;
   a camera of the mobile device;
   a memory of the mobile device; and
   a processing resource configured to execute executable instructions stored in the memory to:
     access, from a mobile device, a captured image of a user;
     measure dimensions of the user based on data collected from the captured image on the user interface of the mobile device using an Infrared (IR) illuminator and visible light from the mobile device;
     construct a three-dimensional (3D) figure of the user using the measured dimensions; and
     project, from the mobile device, an augmented reality (AR) image associated with the 3D figure on the user as a hologram.

9. The device of claim 8, further comprising instructions executable to measure one of a height of the user, a clothing size of the user, a body width of the user, a width and length of the user's foot, or a combination of these.

10. The device of claim 8, wherein the AR image is viewable using a headset, a heads-up display, a light field display and a laser, or a combination of these.

11. The device of claim 8, further comprising instructions executable to measure dimensions of the user by projecting a structured array of light from the camera of the mobile device onto the user.

12. The device of claim 8, wherein the 3D figure is uploaded to a website, a different mobile device, or both.

13. The device of claim 8, wherein the AR image is projected on the user responsive to user interaction with the user interface of the mobile device.

14. The device of claim 8, wherein a preferred 3D figure or AR image of the user is written to the memory of the mobile device.

15. An apparatus, comprising:
    a user interface of a mobile device;
    a camera of the mobile device;
    a memory of the mobile device; and
    a processing resource configured to execute executable instructions stored in the memory to:
      project a structured array of light from the camera of the mobile device onto a captured image of a user on the user interface of the mobile device;
      measure multi-directional sections of the user based on data collected using the projected light from the mobile device;
      construct a three-dimensional (3D) figure of the user based on the measured multi-directional sections;
      display an augmented reality (AR) image of the user associated with the 3D figure as a computing device-generated image superimposed on a user's real-world view; and
      rotate and move the projected AR image responsive to user interaction with the user interface of the mobile device.

16. The apparatus of claim 15, wherein the AR image is viewable on the user interface prior to displaying the AR image.

17. The apparatus of claim 15, further comprising instructions executable to upload the 3D figure to a website, a different mobile device, or both.

18. The apparatus of claim 15, further comprising instructions executable to:
    capture images of the user using the camera of the mobile device;
    construct additional 3D figures using the captured images; and
    select a 3D figure to display as the AR image.

19. The apparatus of claim 15, further comprising instructions executable to:
    write at least one of the 3D figures or the AR images to the memory; and
    discard at least one of the 3D figures or the AR images, or a combination thereof.

20. The apparatus of claim 19, further comprising instructions executable to upload at least one of the 3D figures or the AR images to a product website prior to writing the at least one of the 3D figures or the AR images to the memory.

* * * * *